United States Patent Office 3,070,385
Patented Dec. 25, 1962

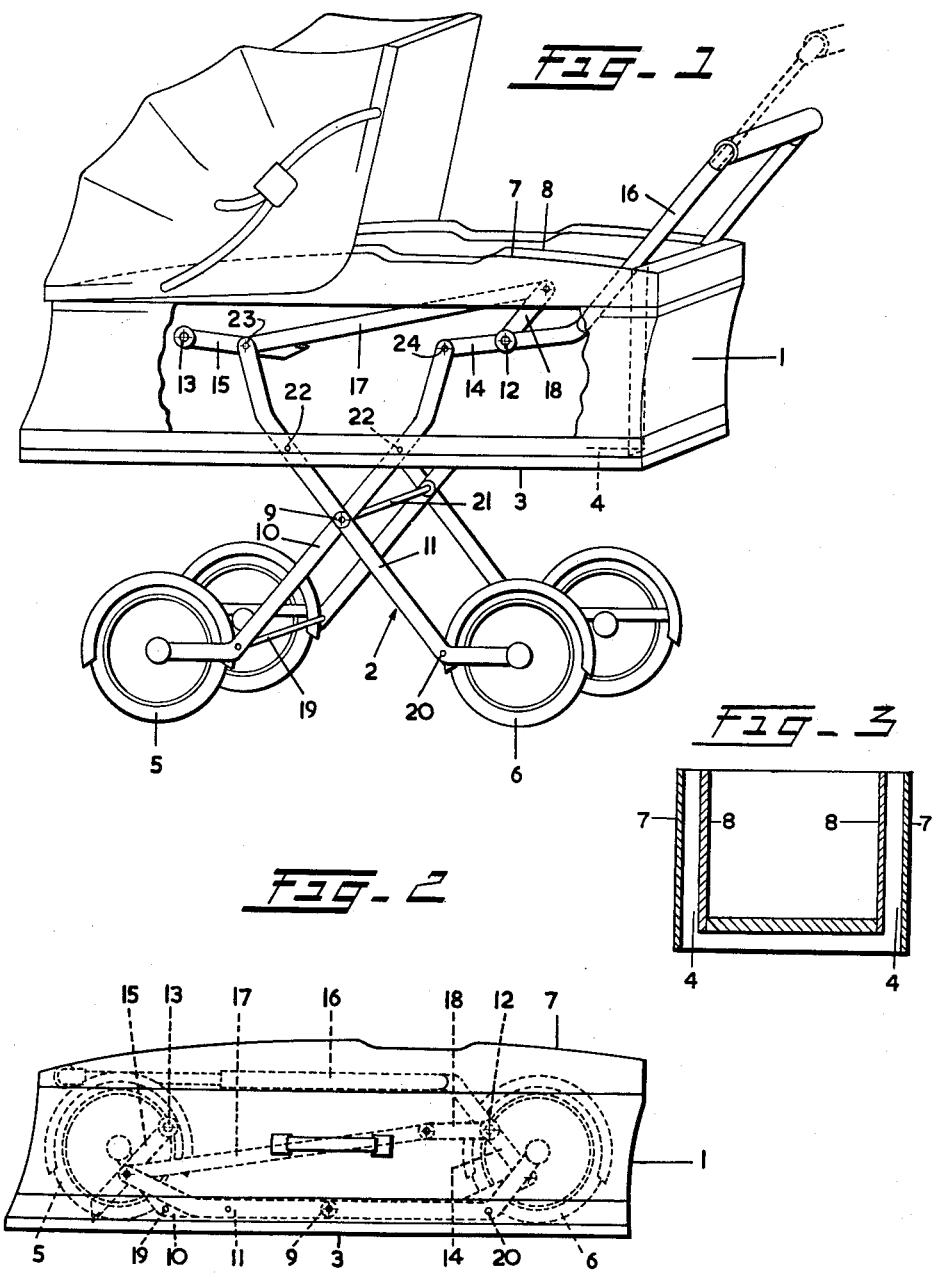

3,070,385
FOLDING PERAMBULATOR
Dominique Paul Gerard Claessens, Stratumsedijk 4, Eindhoven, Netherlands
Filed Aug. 12, 1960, Ser. No. 49,249
Claims priority, application Netherlands Aug. 31, 1959
1 Claim. (Cl. 280—37)

This invention relates to a folding perambulator which in folded condition has the shape of a suitcase. The perambulator comprises a carriage and an underframe having a pair of wheels disposed one behind the other on each side. When the perambulator is folded, said pairs of wheels seat in channels extending along the edge of the bottom of the carriage. Each pair of wheels is connected to a longitudinal side of the carriage by a pair of parallel rods.

In this construction when the perambulator is folded the rods rotate about their point of attachment on the carriage. The centres of the wheels describe circles about said points of attachment. Since the wheels must come within the carriage after the perambulator has been folded, a simple relation exists between the length of the carriage, the wheel base, the radius of the wheels and the length of the rods, and the wheel base plus the length of a rod plus the radius of a wheel has to be smaller than the length of the carriage. It is consequently not possible to make the wheel base and the height of the carriage above the ground sufficiently great at the same time.

The object of the invention is to remove this drawback. For this object the above-described construction is started from. The characteristic feature of the perambulator according to the invention is that the underframe consists of two pairs of main rods pivoted to each other at approximately their midpoints, which rods each carry a wheel at their one end and at their other end are pivoted with respect to a longitudinal side wall of the carriage, said pivoting being effected for at least one of the two rods of each pair of main rods by means of auxiliary rods, to which said main rods are pivoted, which auxiliary rods themselves are likewise rotatable. Each auxiliary rod, when the perambulator is in use, extends from its pivotal securement to the side wall of the carriage in a direction which makes an acute angle with respect to a line drawn between the points of pivotal attachment of the pair of rods on the same side wall. When the perambulator is in the folded position the auxiliary rods are rotated from the previously-mentioned position in such a manner that the space between the pivotal connections of the pairs of main rods to said auxiliary rods is increased and said main rods bear substantially parallel against the bottom of the carriage.

The invention will be elucidated by an example with reference to the accompanying drawing.

An embodiment of the perambulator according to the invention is illustrated therein:

FIGURE 1 shows a perspective view of the perambulator in extended position,

FIGURE 2 is a side view of the perambulator in the folded position, and

FIGURE 3 is a vertical transverse section through the carriage of the perambulator.

The perambulator comprises a carriage 1 and an underframe 2. Channels 4 are provided along the two longitudinal sides of the carriage opening out at the bottom 3 of the carriage. The under-frame 2 shows as having on both sides of the perambulator a pair of wheels 5 and 6 disposed one behind the other which seat in the channels 4 when the perambulator is folded.

The two longitudinal side walls of the carriage 1 are double and comprise wall portions 7 and 8 defining the channel 4 substantially forming inner and outer bodies for said carriage.

Each of the two longitudinal side walls of the carriage 1 is connected to the subjacent wheels by a pair of main rods. Since these pairs of rods are identical it is sufficient to describe the foremost pair of rods. This comprises two main rods 10 and 11 pivoted to each other by the pivot 9, which rods carry the wheels 5 and 6 respectively at their lower end. At their other ends the rods 10 and 11 are pivoted by means of pivot members 23 and 24 to auxiliary rods 14 and 15 which in turn are pivoted, or rotatably mounted with respect to the longitudinal side wall of the carriage 1 by pivot members 12 and 13. In the chosen embodiment the auxiliary rods 14 and 15 rotate downwardly about the pivots 12 and 13 respectively when the perambulator is being folded, and when the perambulator is in use each auxiliary rod is retained in such a position that it extends from the pivot 12 or 13 respectively secured to the side wall in a direction which makes an acute angle with respect to a line drawn between the pivots 12 and 13. The folding of the perambulator takes place by downwardly rotating the auxiliary rods 14, 15 from such angular position in such a manner that the space between the pivots 23 and 24 at the upper ends of the rods 10 and 11 is increased so much that said rods come to bear substantially parallel against the bottom 3 of the carriage.

The folded position of the under-frame 2 is illustrated in FIGURE 2. The folding of the under-frame 2 can be effected by swinging the push rod 16 forward. The push rod 16 is rigidly connected to the auxiliary rod 14. Coupling rods 17 and 18, the latter of which is rigidly connected to the auxiliary rod 14, connect the auxiliary rods 14 and 15 to each other in such a manner that the downward rotation of the one auxiliary rod results in the downward rotation of the other auxiliary rod.

It is possible within the scope of the invention to omit one of the auxiliary rods, e.g. the auxiliary rod 15. The coupling rods 17 and 18 may then also be omitted. The given coupling of the push rod 16 to the auxiliary rod 14 may likewise be omitted, if desired. The auxiliary rod 14 may then be moved in a different manner to effect the folding of the under-frame 2. For instance this can take place by moving the rod 10 by hand in such a way that the auxiliary rod 14 is brought into the position belonging to the folded position. In this last case the auxiliary rod 14 should be somewhat longer than when two auxiliary rods are used.

The pairs of main rods 10, 11 as seen in FIG. 1 are connected to each other by horizontal connecting rods 19, 20, 21 and 22 which in the folded position come to bear parallel against the bottom 3 of the carriage.

The horizontal lower ends of the pairs of rods 10, 11 may also be used for applying a wheel springing.

The construction according to the invention renders it possible to give both the wheel base as well as the wheel diameter and the height of the carriage above the ground the desired adequate value.

I claim:

A folding perambulator which in the folded position takes substantially the form of a suitcase, comprising in combination, a carriage and an underframe including two pairs of wheels, one pair positioned at each side of the carriage, said carriage being formed with channels extending along the sides thereof substantially separating said carriage into inner and outer bodies, said channels opening downwardly for substantial reception of said underframe including said wheels when said underframe is in folded position, said underframe including two pairs of elongated rods one of said pairs being positioned at either side of said carriage, said rods lying in substantially vertical planes and the rods of said pairs crossing at substantially their midpoints when said underframe is in extended position and lying substantially in side by side parallel relationship when said underframe is in folded position, means for pivotally interconnecting said rods at said substantially midpoints, means for mounting one of said wheels adjacent the lower end of each of said elongated rods and means for the pivotal mounting of the upper ends of said elongated rods with respect to the longitudinal side walls of said carriage, said pivotal mounting means including an auxiliary rod for each of said elongated rods, means for rotatably mounting said auxiliary rods within said channels and with respect to the side walls of said carriage, said elongated rods at the upper ends thereof being pivotally mounted on said auxiliary rods at positions spaced toward each other with respect to the rotatable mounting of said auxiliary rods with respect to said channels, said auxiliary rods when said underframe is extended for use extending toward each other from said rotatable mountings and when said underframe is retracted into folded position said auxiliary rods being swung away from each other about said rotatable mountings thereby separating said pivotal mountings of said pairs of elongated rods with respect to said auxiliary rods so that said pairs of elongated rods are moved to a position in which they are substantially parallel to the bottom of said carriage at the mouths of said channels, a push rod for said carriage, means fixedly connecting said push rod to one of said auxiliary rods of each pair thereof, an arm fixedly connected to said one auxiliary rod of each pair of coupling rods pivotally connected at one end thereof to each of said arms, said coupling rods extending to the other of said pairs of auxiliary rods and means for pivotally connecting said coupling rods to said other auxiliary rods, said coupling rods serving to rotate said pairs of auxiliary rods in linked relationship about said rotatable mounting means for movement of said underframe between retracted and extended positions, said pivotal interconnection of said elongated rods moving substantially perpendicularly with respect to the bottom of said carriage as said underframe is moved between retracted and extended positions.

References Cited in the file of this patent

UNITED STATES PATENTS

| | | |
|---|---|---|
| 836,505 | Kalli | Nov. 20, 1906 |
| 1,021,964 | Baesecker | Apr. 2, 1912 |
| 2,564,266 | Linton | Aug. 14, 1951 |
| 2,706,642 | Yarnell | Apr. 19, 1955 |

FOREIGN PATENTS

| | | |
|---|---|---|
| 139,009 | Australia | Oct. 12, 1950 |
| 539,567 | France | Apr. 4, 1922 |
| 567,406 | France | Dec. 6, 1923 |
| 238,409 | Great Britain | Aug. 20, 1925 |
| 421,113 | Italy | May 16, 1947 |